United States Patent
McGourlay et al.

(10) Patent No.: US 7,476,356 B2
(45) Date of Patent: Jan. 13, 2009

(54) METHOD OF FIRING CERAMIC CORE BODIES

(75) Inventors: Jamie C McGourlay, Derby (GB); Bhupendra A Prajapati, Derby (GB)

(73) Assignee: Rolls-Royce plc, London (GB)

( * ) Notice: Subject to any disclaimer, the term of this patent is extended or adjusted under 35 U.S.C. 154(b) by 171 days.

(21) Appl. No.: 11/367,374

(22) Filed: Mar. 6, 2006

(65) Prior Publication Data
US 2006/0223019 A1    Oct. 5, 2006

(30) Foreign Application Priority Data
Apr. 5, 2005    (GB)    ................. 0506833.3

(51) Int. Cl.
C04B 35/64    (2006.01)
(52) U.S. Cl. ................. 264/605; 264/607; 264/432
(58) Field of Classification Search ................. 264/432, 264/605, 607
See application file for complete search history.

(56) References Cited

U.S. PATENT DOCUMENTS
3,585,258 A    6/1971    Levinson
4,880,578 A    11/1989    Holcombe et al.
5,164,130 A    11/1992    Holcombe et al.

FOREIGN PATENT DOCUMENTS
WO    WO 2005/027575 A2    3/2005

*Primary Examiner*—Steven P Griffin
*Assistant Examiner*—Russell J Kemmerle, III
(74) *Attorney, Agent, or Firm*—Oliff & Berridge, PLC

(57) ABSTRACT

Firing of ceramic cores (1) is important in order to achieve manufacturing processes. These ceramic cores (1) are generally formed in a "green" state which has limited mechanical strength and may be distorted during the firing process by non-uniform thermal effects, etc. By providing a tube or containment 2 which is located on a saggar base 3 and surrounded by firing media 4, it is possible to achieve an initial pre-firing step whereby the "green" state core 1 is located through a stem 1a in an initial partial depth 5 of firing media 4 in the tube or containment 2 until it achieves a sufficient mechanical strength to enable positional adjustment. Thus, the green core will be pre-fired in a kiln solely supported through the stem 1a and then the core adjusted using a tool such as an engineering rule. There is a positional accuracy between the walls of the tube or containment 2 and the saggar base 3 between all cores and then the tubes 2 filled and leveled with further firing media 4 for the main firing of the core 1 in use.

5 Claims, 1 Drawing Sheet

METHOD OF FIRING CERAMIC CORE BODIES

The present invention relates to ceramic core bodies and more particularly to setting of such core bodies in their so called initially formed "green state".

Typical prior fire setting approaches for ceramic core bodies used in combination with a conventional firing regime do not suitably accommodate for the large differences in the physical and chemical behaviour that can occur in modern highly complex geometric core bodies during the de-bond and sintering phases of the firing cycle. These geometries exhibit such features as large changes in core body cross-sections, support pedestals, rails, plenums and channel cores, so that in particular 'green' or initially formed cores are prone to additional distortion, cracking and surface degradation using conventional fire-setting processes. This ultimately results in cores of inferior visual, dimensional and material quality and leads to increased performance failure during core manufacture and cast core performance.

It will be appreciated with respect to relatively large components, or those of an intricate nature that the differentials between the firing media and the core body creates stresses due to the variable thermal performance of these materials with respect to each other. Furthermore, the act of packing firing media about the core to be fired may cause distortions. In order to achieve dimensionally consistent cores with less flaws, great care must be taken with respect to the firing media depth for consistency all over the core when fired.

In accordance with the present invention there is provided a method of ceramic core firing comprising the steps of i) locating a core in a containment, ii) filling the containment with a firing media to a first level covering a portion of the core, iii) pre-firing the combination of the containment and the core in an oven to stabilize the core location, iv) filling the containment with further firing media to a second level completely covering the core and v) firing the combination of the containment and the core in an oven.

Preferably, the core comprises a stem and the first level covers part of the stem.

Preferably, additional mechanical support is provided during step iv).

Preferably, the method includes shaking the containment prior to firing.

Figure 1:
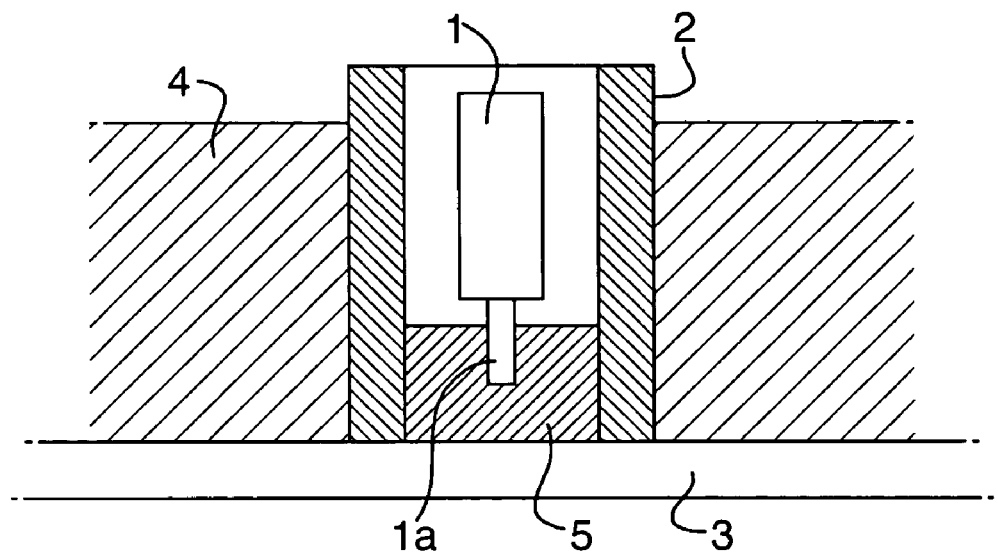
Figure 2:
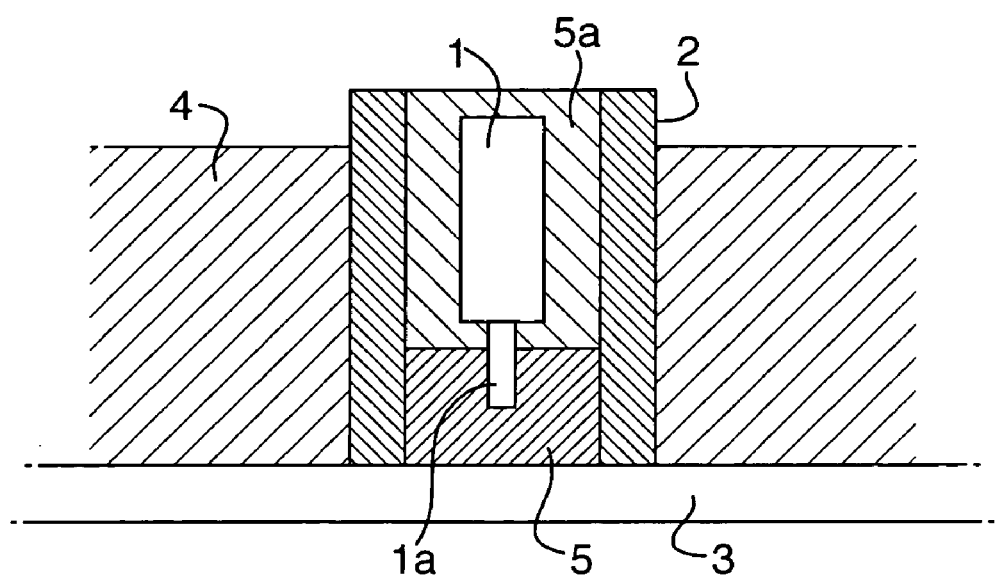

An embodiment of the present invention will now be described by way of example and with reference to the accompanying drawings in which;

FIG. 1 depicts a schematic cross section of a typical core tube firing arrangement in accordance with the present invention during a pre-firing stage; and, FIG. 2 is a schematic cross-section of the arrangement in FIG. 1 during a firing stage.

As indicated above, in order to obtain acceptable cores, it is important to achieve as near consistent thermal environmental uniformity as possible during firing with respect to each core. In such circumstances, potential variations in firing media depth relative to a core according to different positions in a saggar or ceramic dish utilised to transfer the cores to a kiln for firing may be relevant. Particularly when the cores are in their initially formed or moulded 'green' state and therefore have limited mechanical strength. It is important that the utilisation of the firing media does not itself distort the core.

The present invention utilises a tube or containment about the core to be fired. Thus, the tube or containment is an open ended tube or box of specific height, depth, width and wall thickness and dimensional profile for particular operational requirements. Normally the tube is made from the same compound ceramic media as used in the saggar or ceramic dish to support the core for transportation to a kiln or oven for firing. Alternatively, the containment can be constructed from a ceramic fibre board. In either event the material has a primary component of alumina and is thus able to operate and be continuously reused over the temperature range required for normal ceramic core firing processes.

As indicated above, environmental uniformity is important with respect to firing cores, and therefore the tube or containment dimensions are dictated by the size and geometry of the cores which will be contained in the tube or containment during the firing process. In such circumstances, certain tubes or containment sizes may be specific to certain core geometries.

In use the tubes or containments are placed vertically, that is to say with either of the open ends of the tube or containment facing up inside a conventional saggar for core fire setting. Generally, a number of tubes or containments will be spaced apart on the same saggar dependent upon the size of the core to be placed in the tube and thus the size of the tube or containment required. The spacing will be of a specific distance and distribution with in particular saggars or ceramic dishes. Once the tubes or containments are located upon the saggar, these tubes or containments are then surrounded by a firing media until an even and sufficient specific depth of firing media is achieved between any adjacent tube or containment and saggar wall. Subsequently a pre-measured volume of firing media is then placed inside each of the tubes or containments to produce a planting layer of specific depth in the bottom of each tube or containment. This pre-measured volume of firing media in a tube or containment enables the support of the core body once placed in the tube during subsequent tube filling and also regulates the distance of the core to the base saggar and its particular orientation so that it is spaced relative to the saggar.

In accordance with the invention there is then a pre-firing stage during which the cores are sufficiently set, one core per tube or containment in a pre-defined orientation for positional adjustment. This pre-defined orientation and pre-firing stage sets the cores into the firing media at the bottom of the tube or containment to a point at which each core is relatively free standing in the tube. This pre-firing stage is illustrated in FIG. 1. In such circumstances the core is taken from its "green state" or initially moulded stage with limited mechanical stability to a situation where as indicated it is free standing and therefore has sufficient mechanical strength to be free standing within the tube or containment.

By creation of a relatively stable and free standing core, it will be understood that through use of appropriate orientational tools such as an engineering rule it is possible to adjust the core such that all cores are repeatedly located within the respective tube or containment relative to the walls of that tube and also the saggar floor to an accuracy of + or −3 mm. In such circumstances there is relatively good core to core environmental uniformity between each core in its respective tube or containment and between each containment or tube on the support saggar.

As indicated above, FIG. 1 illustrates the pre-firing arrangement of the present invention. Thus, a core 1 is presented in a tube or containment 2 upon a saggar base 3. Around the tube or containment 2, firing media 4 is located to a sufficient depth to provide location of the tube or containment 2. Upon the saggar base 3 and within the tube or containment 2, a level 5 of firing media is located such that the core 1 through a stem 1a allows appropriate location of the core 1 for presetting of the core 1 to a sufficiently mechanically strong state such that it is freestanding. In this state, adjustment is made as indicated, and checked using a device such as engineering rule to ensure that the core 1 is located relative to the walls of the tube or containment 2 and the saggar base 3 to a repeatable accuracy of +/−3 mm for example relative to other cores.

Once appropriately adjusted and presented within the tube or containment 2, the next stage is to fill the remainder of the tube or containment 2 with further firing media. The core 1, depending on its geometry and orientation, may require additional mechanical support during this process to ensure that it does not move during the pouring in of the firing media. Essentially the tubes or containments 2 are filled level with the top of the tube 2. Once all tubes have been filled with the firing media 4 the saggar 3 is shaken using a horizontal agitation of the saggar 3 before being placed on a firing truck ready for entry into the kiln. In such circumstances, due to the pre firing stage, the cores are all substantially located repeatedly relative to the walls of their respective tube or containment 2 and the base 3. In such circumstances, any firing distortion effects are repeatable over all the cores 1 fired.

By use of the tube or containment, a number of advantages over conventional fire setting regimes are achieved. The tubes or containments provide location for each core within relative to the saggar and within the tube and this automatically ensures the core is maintained at a more consistent firing position and orientation along with ensuring greater positional consistency from core to core. In short, use of the tubes or containments ensures there is local environmental thermal uniformity of the cores during the firing stage. Each core is maintained in its specific orientation within a repeatable specific volume of firing media surrounding it. By such greater specific control of the firing media surrounding the core, it will be understood that there is enhanced performance in terms of the firing media during the critical phases of firing, that is to say de-bond and sintering of the "green" ceramic core.

By ensuring environmental thermal uniformity, greater consistency in fired cores can be achieved. By use of a tube or containment, there is control of the local thermal environment about the core during the ceramic firing process. Such greater local thermal control ensures that there is consistency with respect to relatively complex geometric cores which as described previously may suffer critical defect areas under the action of conventional ceramic fire and setting regimes in terms of local variation of the thermal regime experienced by the core. This reduces the potential for defect creation and propagation.

In the above circumstances, overall there is a significant reduction in the dimension and visual defects associated with cores produced in accordance with the present invention in comparison with conventional firing regimes using a conventional ceramic fire setting regime. With the present arrangement and method, highly complex geometric structures can be fired in normal firing kilns ensuring a generic process can be maintained without detrimental effect to fired core quality.

FIG. 2 illustrates the firing arrangement in accordance with the present invention during the main firing stage. Thus, in comparison with FIG. 1, it will be noted that the firing media 5*a* extends to the top of the tube or containment 2. The firing media 5*a* is shaken such that the top of the firing media 5*a* is substantially flat across the tube or containment 2. As indicated previously the core 1 is appropriately positioned to ensure that there is location of the core 1 to an accuracy of +/−3 mm relative to the walls of the tube or containment 2 and the saggar base 3. In this condition the core 1 is fully fired to its final state.

It will be appreciated that the actual temperatures, time periods and other factors utilised with respect to core firing will be substantially the same as previous regimes, thus these parameters will be operationally variable dependent upon the actual core to be fired.

The present invention also utilises a method of core firing. This method as indicated incorporates the use of a tube or containment 2 such that the core is initially placed within a tube or containment 2 on a saggar base 3. As described previously, initially the tube or containment 2 will be located on the saggar base 3 and then firing media 4, 5 packed within and thereabout to sufficient depth to ensure location of the tube on the saggar base 3 as well as provide a planting matrix for location of the "green" core 1 upon a stem 1*a* within the tube or containment 2.

As indicated previously, normally a number of tubes or containments 2 will be located on the same ceramic dish or saggar base 3 transport utilised for delivery of the whole to a kiln for firing. Nevertheless, each tube will accommodate its own green state core 1 located in the firing media 5. In a pre firing state as indicated above, the core 1 will be pre-fired until it achieves an appropriate mechanical strength to be free standing and supported. In this pre-fired state adjustment will be made to ensure positional location of the core within its respective tube or containment 2 within the desired operational accuracy. As indicated previously, typically this accuracy is +/−3 mm.

Once completely located or confirmed within the tube or containment 2, the core 1 can then be surrounded by further firing media. Where necessary the core may be supported or reinforced to prevent displacement upon fully of the containment with firing media 5 to a desired positional accuracy as described above through use of further reinforcement and support as the further firing media is introduced into the tube or containment 2.

Once the further firing media is introduced into the tube, appropriate mechanisms are utilised in order to level off the firing media 5 at the top of the tube or containment 2. This may be through horizontal agitation shaking the excess firing media off to level. The arrangement is then fired in a kiln to achieve the desired core stabilisation for subsequent manufacturing processes.

As indicated above, essentially uniformity of environmental conditions during firing is the objective. Thus, to further enhance such uniformity, the tubes or containments may be specifically shaped and manufactured to imitate the precise profiles and geometries of the underlying cores they will enclose. In such circumstances, such specific profiling will regulate core to tube or containment wall section geometries and so the amount of surrounding firing media utilised and present that firing media to the core for greater consistency. Additionally, it will be appreciated that certain critical core geometries may need more firing media support, either by way of mass or density, than other cores or there may be improved regulation of heating during firing. Either of these approaches may be further achieved through use of tubes or containments that have been specifically shaped or moulded to form a particular specific shape and a wall section for fired core encapsulation.

Coffin style closures including a base and a lid arrangement may also be used in the same way as firing tubes to facilitate better position and thermal profiles for cores during firing processes.

Improvements and alternatives to the embodiments of the present invention described above will be envisaged by those skilled in the art. Thus, for example the tubes and containments can as illustrated be substantially cylindrical or may have a square cross section or otherwise shaped as required to provide uniformity of environmental conditions for a ceramic core located within the tube. Additionally, as illustrated, the tubes or containments may be substantially uniformly thick flat walled components or alternatively may be internally shaped for reciprocal profiling to an opposed core in order to provide consistency of firing medium gap between that core and a wall surface of the tube or containment. Externally of the tube or containment, fins or outward projections may be provided for inter-engagement with the firing medium to further facilitate secure location of the tube or containment relative to the firing medium or inner saggar to maintain spacing between such tubes or containments as required for consistency.

We claim:

1. A method of ceramic core firing, comprising the steps of:
  i) locating a core in a containment;
  ii) filling the containment with a firing media to a first level covering a portion of the core;
  iii) pre-firing the combination of the containment and the core in an oven to stabilize a location of the core;
  iv) filling the containment with further firing media to a second level completely covering the core; and
  v) firing the combination of the containment and the core in the oven.

2. The method as claimed in claim 1, wherein the core comprises a stem, and the first level covers part of the stem.

3. The method as claimed in claim 1, wherein additional mechanical support is provided during step iv).

4. The method as claimed in claim 1, further comprising shaking the containment prior to firing.

5. The method as claimed in claim 1, wherein the pre-firing of step iii) includes heating the combination of the containment and the core.

* * * * *